Dec. 4, 1951 M. R. DOHERTY 2,577,236
MARINE FENDER
Filed March 31, 1950 2 SHEETS—SHEET 2
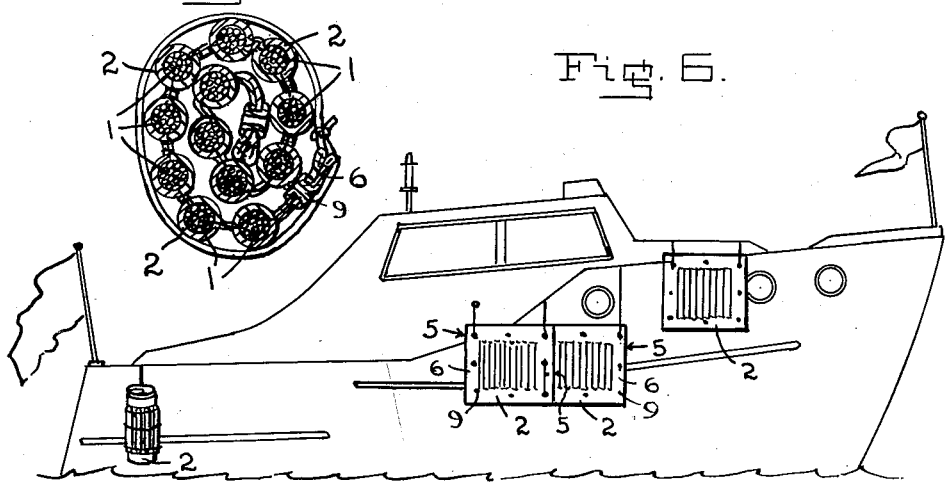
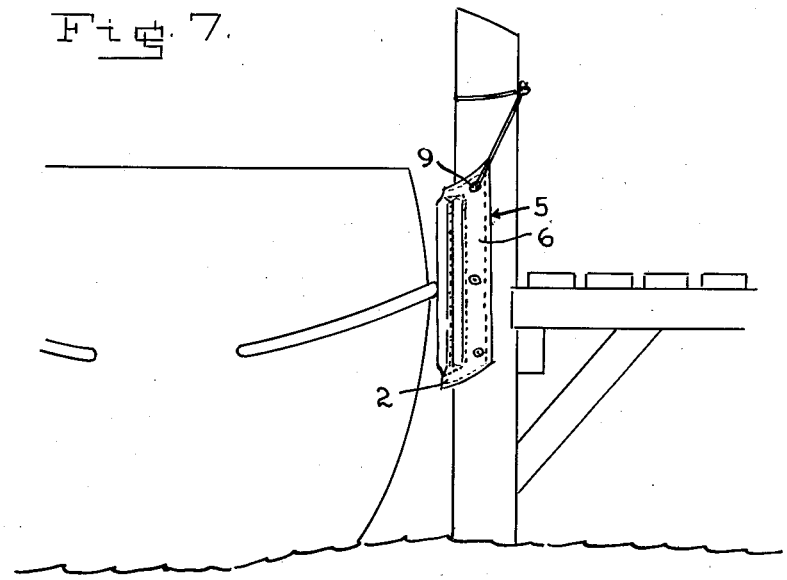
INVENTOR
Margaret R. Doherty
BY
ATTORNEY Patented Dec. 4, 1951

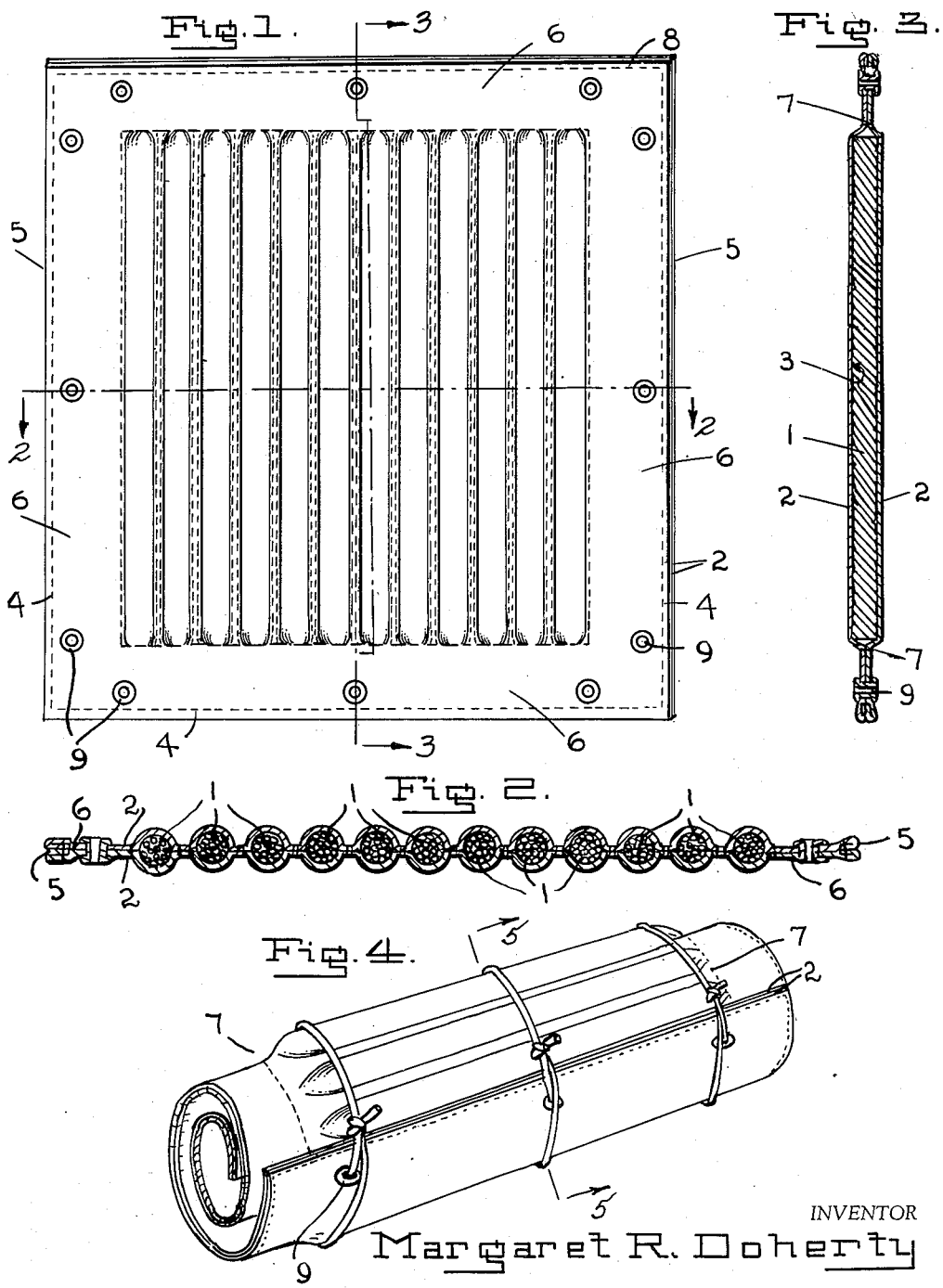

2,577,236

UNITED STATES PATENT OFFICE 2,577,236

MARINE FENDER

Margaret R. Doherty, Wilmington, Del.

Application March 31, 1950, Serial No. 153,057

1 Claim. (Cl. 114—219)

The present invention relates to an improvement in marine fenders and is particularly concerned with the type of fenders that are used to protect the sides of a ship from injury by contact with other ships and such marine structures as wharves, break-waters, canal locks, and the like. My marine fenders may be used on piers, break-waters, etc., as well as on ships themselves. Also, my fenders may be used conveniently to protect the deck of a vessel from injury by heavy objects such as anchors, oil drums, etc.

Prior to this invention, the marine fenders known to me have been unsatisfactory for several reasons. Some marine fenders are cumbersome and not sufficiently yielding, properties which make them objectionable to use and a problem to stow away when not in use. Some marine fenders are of such a nature as to limit their protective effect to a very restricted area of the vessel's surface and consequently necessitate exact placement. Some marine fenders involve the use of expensive materials and elaborate procedures in manufacture and therefore are restrictively costly.

Objects of my invention are to provide a marine fender that overcomes the objectionable features mentioned. These objects are accomplished by utilizing in my boat fender readily obtainable materials of comparatively low cost, put together by simple methods of construction. Convenience in use, and a satisfactory cushioning effect, result from the employment of non-metallic fiber rope or the like as the cushioning material, in an assemblage that permits the fender to be varied quickly and easily in extent and thickness to suit the conditions of contact that are anticipated at the time of use. These variations in thickness, and size, and shape, are permitted by a construction which allows the fenders to be rolled from flat into cylindrical form, and which makes it possible to tie together a plurality of the marine fenders for longer or broader coverage. These variable features of my fender also facilitate stowage when the fender is not in use.

A complete understanding of my invention in all its details will be readily obtained from the following description, in conjunction with the accompanying drawings wherein several aspects of the invention have been shown.

Referring to the drawings, the construction shown in Figures 1, 2, 3, 4, and 5 comprises a casing or envelope of strong but flexible fabric enclosing a cushion of resilient rope segments.

Figures 1 is a perspective view of a boat fender constructed in accordance with a preferred embodiment of this invention, shaped in rectangular form for best protective coverage and convenient stowage;

Figure 2 is a cross section of the boat fender along the line 2—2 of Figure 1 but on an enlarged scale;

Figure 3 is a longitudinal mid-section of a portion of the fender along the line 3—3 of Figure 1;

Figure 4 is a perspective view of a fender rolled to cylindrical form for maximum thickness of resilient material;

Figure 5 is a cross section of a fender in cylindrical form along the line 5—5 of Figure 4;

Figure 6 is a perspective view of a vessel equipped with several shapes and sizes of fenders embodying the invention, disposed along the side to provide protection at various points of the hull.

Figure 7 is a perspective view of a wharf pile equipped with one of my marine fenders.

Referring to the drawing by numerals, each of which is used to indicate the same or similar parts in the different figures, the construction shown in Figures 1, 2, 3, 4, and 5 consists of a plurality of pieces of resilient material 1, each more or less cylindrical in shape and solid in form, and arranged approximately parallel to one another, each in a sheathing of heavy canvas 2 or similar strong but pliable fabric.

The length, thickness, and number of the pieces 1 will depend on the desired shape, size, and thickness of the fender, but all pieces in any rectangular fender are usually of approximately the same length. Such pieces conveniently are made from new or used rope or other like stranded fibrous material, excluding metallic cords and cables.

The fabric sheathing 2 is made to contain cylindrical pockets 3, each slightly larger in internal diameter than the external diameter of the previously mentioned individual pieces of resilient material 1. This is readily done by stitching or otherwise fastening together along three sides 4 two matching rectangular pieces of fabric, then in a central area stitching the two pieces together along lines parallel to two of the sides 5. These parallel rows of stitching are desirably spaced at intervals approximately one and three quarter times the outside diameter of the segments of resilient material, depending on the thickness and flexibility of the canvas casing—the object being to have the lines of stitching so spaced as to form pockets that will readily permit introduction of the segments of rope to form a central cushion area. After the segments of rope or like cushioning material are placed in the pockets they may be held in place by rows of stitching 7 across the ends of the pockets.

The dimensions of the fabric rectangle should be sufficiently great to allow a flattened double-thick, marginal area 6 around the cushioning pad. Construction of the boat fender is completed by stitching or otherwise sealing the open end of the casing 8 and by forming perforations 9 in the marginal areas. Edges of the perforations may be bound with metal or cord to strengthen them for holding lanyards or tie-lines with which to attach the boat fenders to boats, docks, etc. By means of the lanyards a plurality of the boat fenders may be tied together to provide fenders of larger size and particular shape. Also, the lanyards may be used to hold the boat fenders in rolled form when fenders of that form are desired for use or storage. It will be apparent from the segmented character of the fender in flat form that it can be rolled easily into an essentially cylindrical form as shown in Figures 4 and 5, thereby greatly enhancing the buffering action of the fender, when necessary.

The canvas casing of the boat fender may be treated to render it substantially impervious to air and water by coating or impregnating with a waterproofing material or materials. Such treatment gives to the boat fender more lasting buoyancy, if dropped into the water. Likewise, the boat fender may be made fire-resistant by treatment with known suitable materials.

From the foregoing it will be understood that a novel marine fender has been provided which will be capable of absorbing shocks incident to the contacting of a pier by a ship and thus protecting the sides of the ship from injury. The construction is extremely simple and capable of being produced at relatively low cost, as well as being capable of quick and easy installation and removal. Obvious, too, will be the advantages of a boat fender that can be stowed or used in rolled or flat form, that can be used as a protective deck mat, and of which a plurality can be tied together quickly and easily to form a boat fender of greater size, and desired shape.

Having thus fully described my invention, what I claim and wish to secure by Letters Patent of the United States is:

A marine fender consisting of a woven organic fiber casing having flattened perforated marginal areas and a central expanded cushioning area formed by encased segments of non-metallic rope held in parallel relationship by constrictions in the casing.

MARGARET R. DOHERTY.

REFERENCES CITED

The following references are of record in the file of this patent:

UNITED STATES PATENTS

| Number | Name | Date |
|---|---|---|
| 353,718 | Tuck | Dec. 7, 1886 |
| 2,433,569 | Marchal | Dec. 30, 1947 |

FOREIGN PATENTS

| Number | Country | Date |
|---|---|---|
| 536,883 | Great Britain | May 30, 1941 |